United States Patent [19]

Hayashi et al.

[11] Patent Number: 5,447,194
[45] Date of Patent: Sep. 5, 1995

[54] STACKED HEAT EXCHANGER

[75] Inventors: Masateru Hayashi; Kazuo Ishii, both of Niahi-biwajima; Shoji Fukami, Nagoya; Yoshifumi Moriguchi, Nagoya; Minoru Ohtsuka, Nagoya, all of Japan

[73] Assignee: Mitsubishi Jukogyo Kabushiki Kaisha, Tokyo, Japan

[21] Appl. No.: 112,425

[22] Filed: Aug. 25, 1993

[30] Foreign Application Priority Data

| Aug. 31, 1992 | [JP] | Japan | 4-231188 |
| Aug. 31, 1992 | [JP] | Japan | 4-231189 |
| Aug. 31, 1992 | [JP] | Japan | 4-231190 |
| Aug. 31, 1992 | [JP] | Japan | 4-231191 |

[51] Int. Cl.$^6$ .................................. F28D 1/00
[52] U.S. Cl. .................................. 165/149; 165/153
[58] Field of Search .................. 165/153, 149, 152

[56] References Cited

U.S. PATENT DOCUMENTS

| 4,274,482 | 6/1981 | Sonoda | 165/153 |
| 4,696,342 | 9/1987 | Yamauchi et al. | 165/152 |
| 4,967,834 | 11/1990 | Tokizaki et al. | 165/153 |
| 5,042,577 | 8/1991 | Suzumura | 165/153 |

FOREIGN PATENT DOCUMENTS

| 3606253A1 | 6/1986 | Denmark | F28D 1/00 |
| 2223131 | 10/1974 | France | F28F 9/02 |
| 61-184394 | 5/1986 | Japan . | |
| 188188 | 7/1989 | Japan . | |
| 2116687 | 9/1983 | United Kingdom . | |

*Primary Examiner*—A. Michael Chambers
*Attorney, Agent, or Firm*—Arnold, White & Durkee

[57] ABSTRACT

The stacked heat exchanger in accordance with the present invention comprises flat tubes and corrugated fins which are alternately put together, the flat tube having a tank portion and a core portion, the tank portion on one side at the outermost portion having an inlet header, the tank portion on the other side at the outermost portion having an outlet header, and the core portion having a side plate as an external plate at both ends, wherein the upper end of the side plate abuts against the lower end of the inlet header and the lower end of the outlet header. Therefore, when a pressure is applied, a force in the spreading direction applied to the inlet/outlet tank portion is received by the abutting of side plate against said inlet and outlet headers. Thus, the deformation of the whole stacked heat exchanger can be prevented.

4 Claims, 17 Drawing Sheets

FIG. 19
RELATED ART
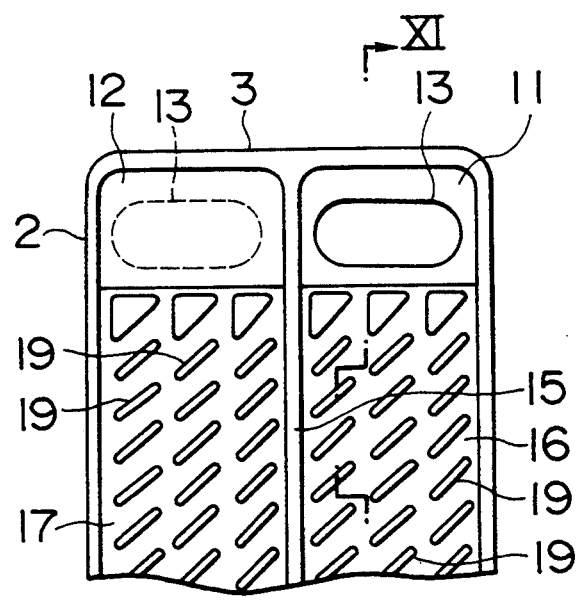
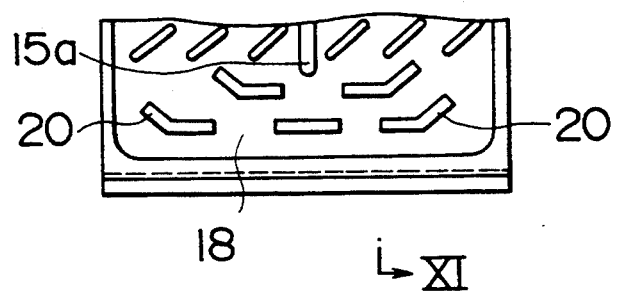

FIG. 20
RELATED ART
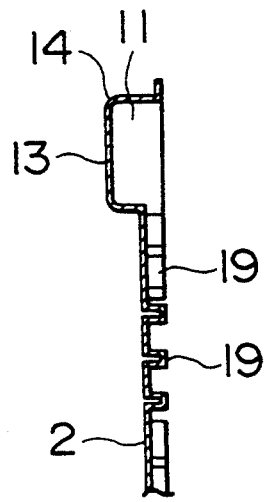
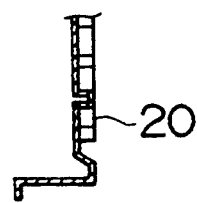

STACKED HEAT EXCHANGER

FIELD OF THE INVENTION AND RELATED ART STATEMENT

The present invention relates to a stacked heat exchanger which can be used for an air conditioner and, more particularly to a stacked heat exchanger having high resistance to pressure, particularly suitable for use as an evaporator of automotive air conditioner.

A conventional stacked heat exchanger will be described with reference to FIGS. 17 through 21. FIG. 17 is a side view of a conventional stacked heat exchanger, and FIG. 18 is an expanded cross-sectional view of its right side portion.

Referring to FIGS. 17 and 18, reference numeral 1 denotes a flat tube. It is formed of two press-formed plates 2 which are butted together. An inlet/outlet tank portion 3 is formed at one end (upper end in the figure) of the flat tube 1. Reference numeral 4 denotes a corrugated fin.

The main portion of a stacked heat exchanger (evaporator) 5 is constructed by alternately putting flat tubes 1 and corrugated fins 4 together and connecting the inlet/outlet tank portions 3 of the adjacent flat tubes 1.

At the outside of the flat tube 1a located at each end, an end plate 6 is disposed, and the end plate of the inlet/outlet tank portion 3 is provided with a through hole 7. The through hole 7 at one end is connected to an inlet header 8 for refrigerant, while the through hole 7 at the other end is connected to an outlet header 9 for refrigerant.

A clearance for repair is provided between the inlet header 8 and a side plate 10 and between the outlet header 9 and the side plate 10. Between the side plate 10 and the end plate 6 provided are corrugated fins 4.

The inlet/outlet tank portion 3 is partitioned into an inlet portion 11 and an outlet portion 12 in the plate width direction of the flat tube 1 by a partition (not shown). When the evaporator 5 is constructed, the inlet portions 11 of the adjacent inlet/outlet tank portion, as well as the outlet portions 12 thereof, communicate with each other through communicating holes 13.

The flat tube 1 will be described with reference to FIGS. 19 and 20. FIG. 19 is a front view of a plate 2 forming the flat tube 1, and FIG. 20 is a cross-sectional view taken along the line XI—XI of FIG. 19.

The upper end portion of the plate 2 is provided with an expanded portion 14 for forming the inlet/outlet tank portion 3. The hollow portion of the plate 2 is divided into two chambers 16 and 17 by a partition 15 extending vertically at the center. The lower end portion of the partition 15 is omitted, so that the lower end of the plate 2 constitutes a U-turn portion 18 for allowing the U-turn of the refrigerant.

By butting two plates 2 together, the inlet/outlet tank portion 3 is divided into the inlet portion 11 and the outlet portion 12 by the partition 15, and at the same time the flat tube is divided into the chamber 16 communicating with the inlet portion 11 and the chamber 17 communicating with the outlet portion 12. Further, the chamber 16 communicates with the chamber 17 at the U-turn portion 18. Thus, the chambers 16 and 17 and the U-turn portion 18 constitute a fluid passage.

In the chambers 16 and 17, many ribs protrude so that the insides of the chambers 16 and 17 are fractionized by the ribs like a maze. At the U-turn portion 18, guide ribs 20 protrude, so that the U-turn flow of the refrigerant is guided from the chamber 16 to the chamber 17 by the guide ribs 20.

Next, the flow of the refrigerant in the above-described evaporator 5 will be described with reference to FIG. 21. FIG. 21 shows the flow of refrigerant.

The evaporator 5 is broadly divided into three groups 21, 22, and 23. The arrangements of the inlet portion 11 and the outlet portion 12 of the groups 21 and 23 connected to the inlet header 8 and the outlet header 9, respectively, are the same, but the arrangement of the inlet portion 11 and the outlet portion 12 of the group 22 is reverse.

For the inlet/outlet tank portion 3 opposing between the group 21 and the group 22 and between the group 22 and the group 23, the outlet portion 12 of the group 21 communicates with the inlet portion 11 of the group 22, and the outlet portion 12 of the group 22 communicates with the inlet portion 11 of the group 23. The inlet portion 11 of the group 21 is connected to the inlet header 8 through the through hole 7 of the end plate 6, while the outlet portion 12 of the group 23 is connected to the outlet header 9 through the through hole 7.

Refrigerant 31 introduced into the evaporator 5 through the inlet header 8 is sent from the inlet portion 11 of the group 21 to the U-turn portion 18 through the chamber 16, makes a U-turn at the U-turn portion, and is sent to the outlet portion 12 through the chamber 17. The refrigerant 31 which has been sent to the output portion 12 is sent to the inlet portion of the group 22, and then is sent to the group 23 after flowing in the group 22 in the same way as in the group 21. Finally, the refrigerant 31 is discharged from the outlet header 9 after flowing in the fluid passage (chambers 16 and 17, U-turn portion 18) of the group 23.

In this process, air 32 is sent to between the corrugated fins 4, so that the air 32 is cooled by using the latent heat due to evaporation of refrigerant 31.

In the above described evaporator 5, a clearance is defined between the lower end of the outlet header 9 and the upper end of the side plate 10 for servicing the brazed portion as shown in FIG. 17. Though not shown in the figure, a similar clearance is formed between the lower end of the inlet header 8 and the upper end of the side plate 10.

The presence of such clearances produces the leakage of air from the clearance, so that there is a possibility of decreased heat exchange property in the evaporator 5. The core portion (chambers 16 and 17, U-turn portion 18) has a higher compressive strength than the inlet/outlet tank portion 3. Therefore, when a pressure is applied, the inlet/outlet tank portion 3 expands due to the presence of the clearance, so that there is a possibility that the whole of evaporator 5 is deformed into a fan shape.

The side plate and the like of the above-described stacked heat exchanger is formed of a clad material in which a base of aluminum etc. is clad with a sheet-shaped brazing material. Therefore, the whole evaporator and the side plate or the like are brazed by restraining the whole with the evaporator being assembled and by putting it into a heating furnace. In this process, the flat tube 1 is brazed to the corrugated fin 4 and the inlet/outlet tank portions 3 are brazed to each other. The flat tube 1 is brazed to the corrugated fin at contact points. The plates 2 forming the flat tube 1 are brazed to each other at the joints such as the edge portion and the contact portions of ribs 19 and 20 protruding in the inside.

This brazing operation provides high strength because the core portion, which is a joint portion between the flat tube 1 and the corrugated fin 4, has more brazing points than the inlet/outlet tank portion 3.

Therefore, when a pressure is applied by the flow of refrigerant, the inlet/outlet tank portion 3 expands widely as described above because that portion has a low strength, so that there is a possibility that the whole of evaporator 5 is deformed into a fan shape.

Such a stacked heat exchanger must be made compact and lightweight because it is mounted on a motor vehicle. The stacked heat exchanger must be small as a whole. If the header portion juts out from the core portion, the portion corresponding to the jutting of the header portion provides a loss space of cooler case on the core portion side.

One of possible means for making the header compact is to flatten the pipe. However, if the pipe is merely flattened, it expands when a pressure is applied.

OBJECT AND SUMMARY OF THE INVENTION

An object of the present invention is to provide a stacked heat exchanger in which the inlet/outlet tank does not expand appreciably even when a pressure is applied to the inlet/outlet tank, and the header portion can be made compact.

To achieve the above object, the present invention provides a stacked heat exchanger comprising flat tubes and corrugated fins which are alternately put together, the flat tube having a tank portion and a core portion, the tank portion on one side at the outermost portion having an inlet header, the tank portion on the other side at the outermost portion having an outlet header, and the core portion having a side plate as an external plate at both ends, wherein the upper end of the side plate abuts against the lower end of the inlet header and the lower end of the outlet header.

Therefore, when a pressure is applied, a force in the spreading direction applied to the inlet/outlet tank portion is received by the abutting of side plate against said inlet and outlet headers. Thus, the deformation of the whole stacked heat exchanger can be prevented.

Further, to achieve the above object, the present invention provides a stacked heat exchanger comprising flat tubes and corrugated fins which are alternately put together, the flat tube being formed by butting two plates having a tank portion and a core portion, the plates located on the right and left side constituting an end plate, the end plate having headers at the inlet and outlet of a fluid, the parts being joined by brazing, wherein the brazing fillet radius R of the brazing joint at the tank portion of the flat tube is not less than 0.2 mm, and the vertical distance from the brazing fillet between the plate and the upper brazing joint of the end plate to the brazing fillet between the header and the upper brazing joint of the end plate is not more than 0.2 mm.

Therefore, the fillet of the brazing joint between the tank portions is increased, so that the strength of the whole tank portion is enhanced, and the resistance to pressure is increased. By setting the vertical distance from the brazing fillet between the plate and the upper brazing joint of the end plate to the brazing fillet between the header and the upper brazing joint of the end plate to 0.2 mm or less, the stress created at the upper brazing joint can be reduced.

Still further, to achieve the above object, the present invention provides a stacked heat exchanger comprising flat tubes and corrugated fins which are alternately put together, the flat tube being formed by butting two press-formed plates which have inlet/outlet tank portion at one end and a fluid passage between the inlet/outlet tank portions, wherein the upper half of the inlet/outlet tank portion is elliptical.

In the stacked heat exchanger of the above construction, since the upper half of the inlet/outlet tank portion is elliptical, the strength can be enhanced. Also, the compactness in the vertical direction can be maintained.

Still further, to achieve the above object, the present invention provides a header for a stacked heat exchanger which is mounted at the inlet and outlet of fluid at a tank portion in a stacked heat exchanger comprising flat tubes having a tank portion and a core portion and corrugated fins which are alternately put together, and has a flat cross-sectional shape in which vertical dimension is larger than the dimension in the width direction, wherein the upper and lower edges in the width direction is of circular arc shape, the thickness thereof is larger than that of the vertical side, and the center of communicating hole to the tank portion disposed at the vertical side is shifted with respect to the center of header.

Therefore, the header can be made compact, while a predetermined strength is maintained. Thus, the header can be flush with the outside surface of the core portion, and the whole stacked heat exchanger can be made compact.

BRIEF DESCRIPTION OF THE DRAWINGS

In the drawings,

FIG. 19 is a front view of a plate forming a flat tube, FIG. 20 is a cross-sectional view taken along the line XI—XI of FIG. 18.

DETAILED DESCRIPTION OF PREFERRED EMBODIMENTS

Figure 1:
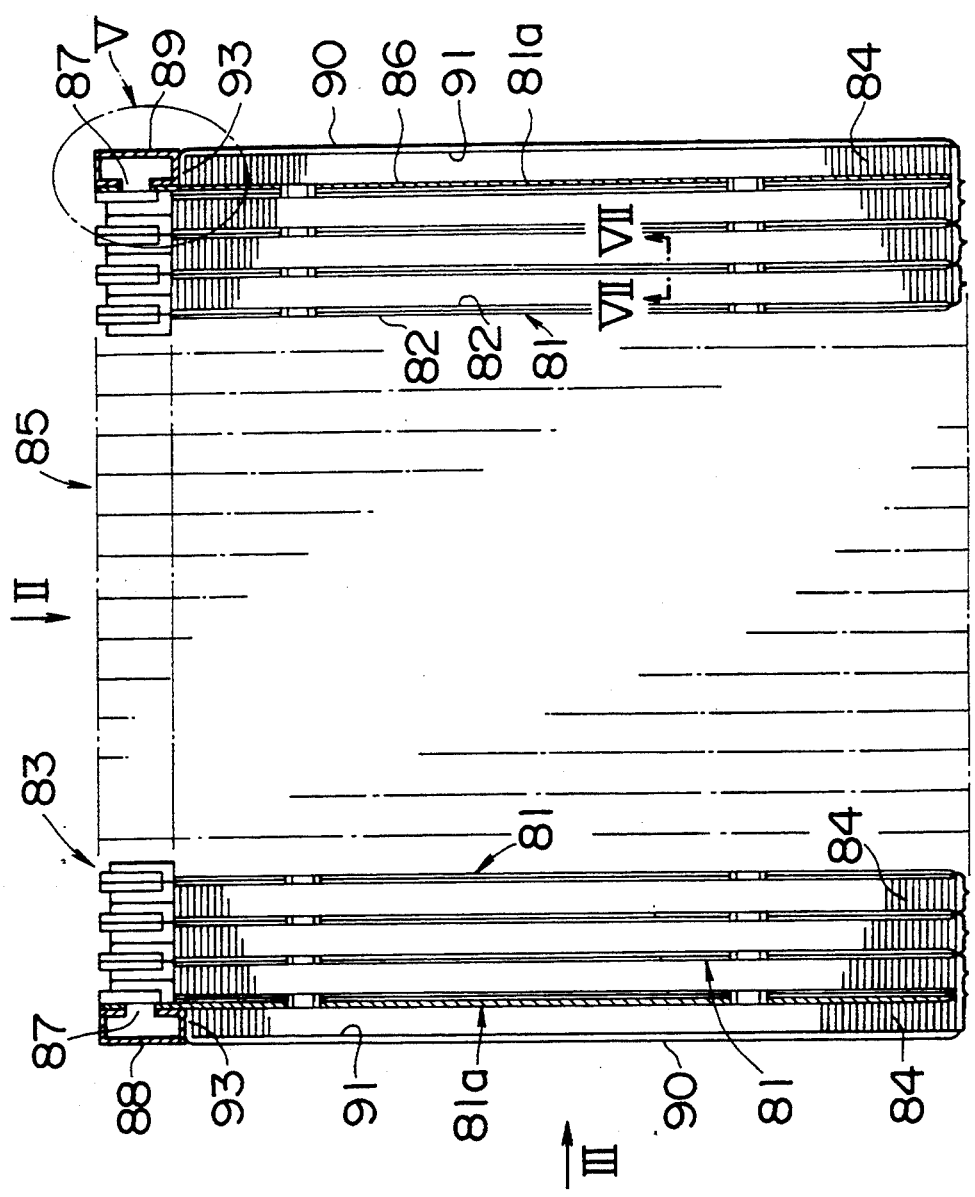
FIG. 1 is a side view of a stacked heat exchanger in accordance with one embodiment of the present invention.
Figure 2:
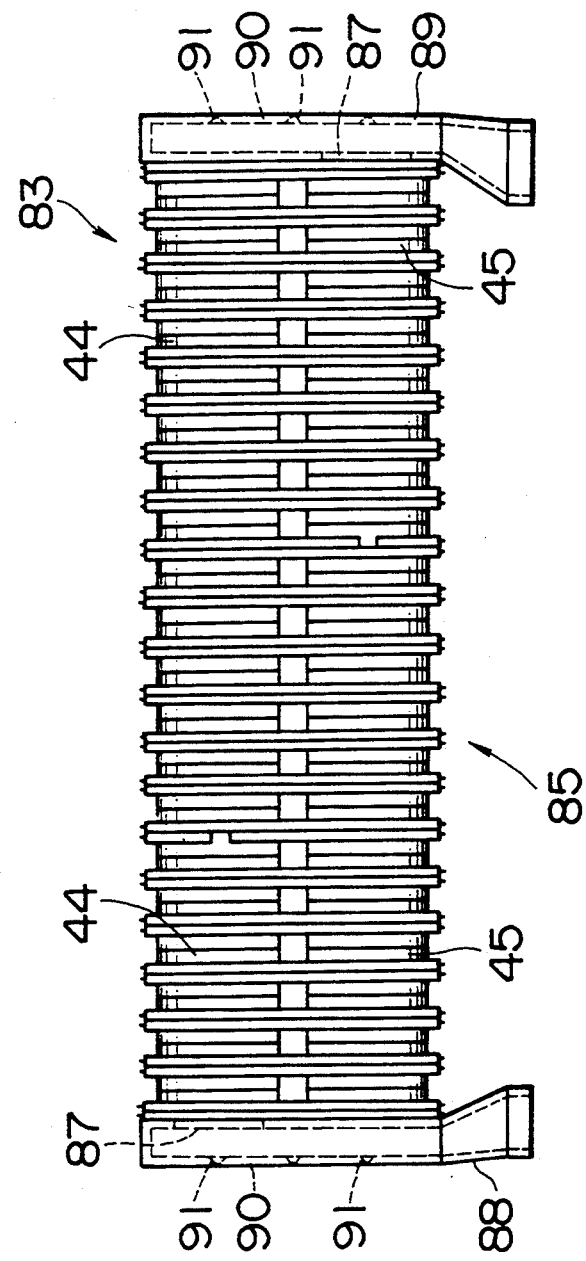
FIG. 2 is a view in the arrow II direction in FIG. 1.
Figure 3:
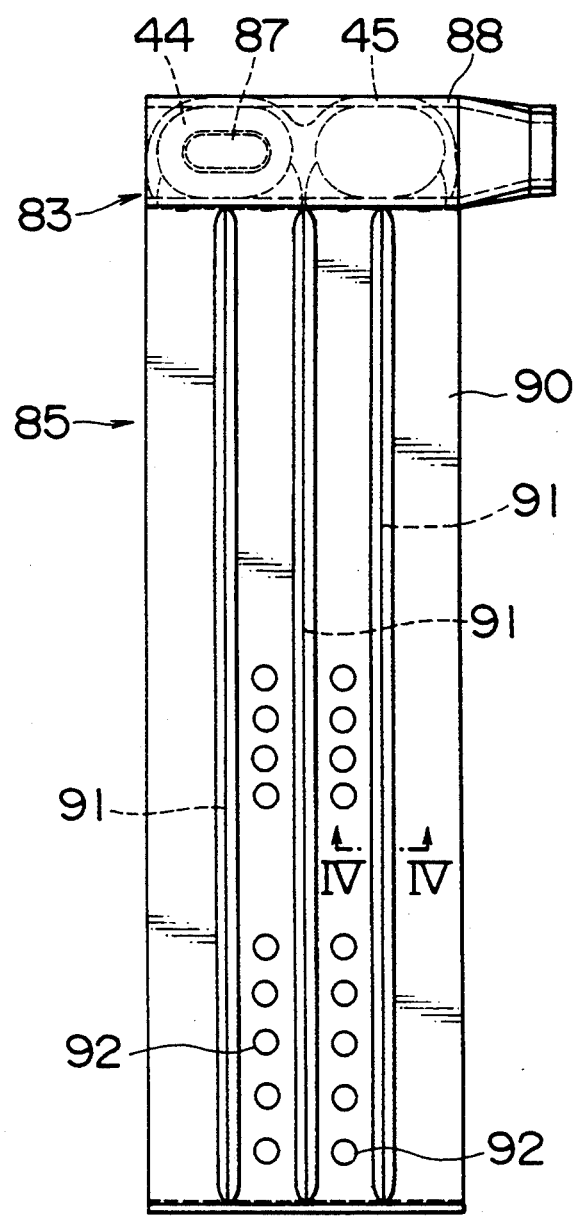
FIG. 3 is a view in the arrow III direction in FIG. 1.
Figure 4:
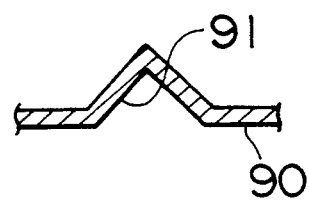
FIG. 4 is a cross-sectional view taken along the line IV—IV of FIG. 3.

FIG. 1 is a side view of a stacked heat exchanger in accordance with one embodiment of the present invention. FIG. 2 is a view in the arrow II direction in FIG. 1. FIG. 3 is a view in the arrow III direction in FIG. 1. FIG. 4 is a cross-sectional view taken along the line IV—IV of FIG. 3.

In FIG. 1, reference numeral 81 denotes a flat tube. The flat tube 81 is formed by butting two press-formed plates 82 together. An inlet/outlet tank portion 83 is formed at one end (upper end in FIGS. 1 and 3) of the flat tube 81. The other end side of the flat tube 81 except the inlet/outlet tank portion 83 constitutes a core portion.

A stacked heat exchanger (evaporator) 85 is constructed by alternately putting flat tubes 81 and corrugated fins 81 together and connecting the inlet/outlet tank portions 83.

The outside of the flat tube 81a located at each end constitutes an end plate 86. The end plate 86 at the inlet/outlet tank portion 83 is provided with a through hole 87.

The through hole 87 at one end is connected to an inlet header 88 for refrigerant, while the through hole 87 at the other end is connected to an outlet header 89 for refrigerant. At the outside of the end plate 86, the corrugated fins 84 are arranged, and at the outside of the corrugated fins, a side plate 90 is installed as an external wall plate.

Figure 6:
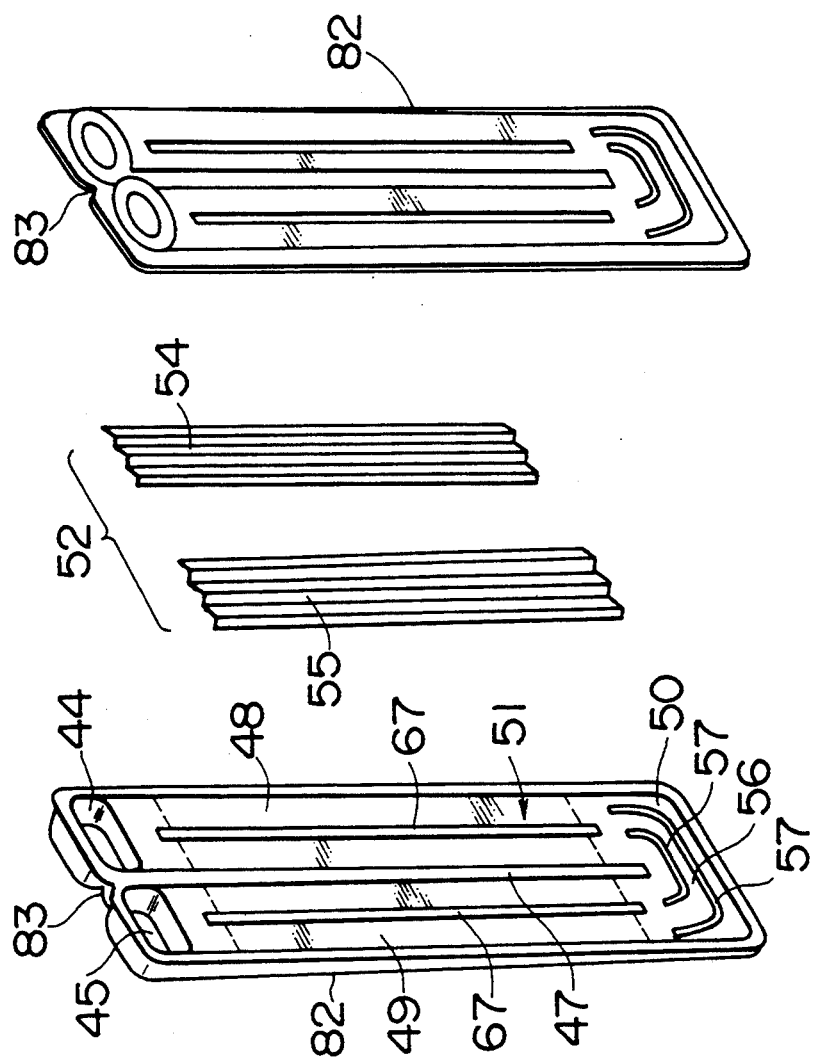
FIG. 6 is an exploded perspective view of a flat tube.
Figure 7:
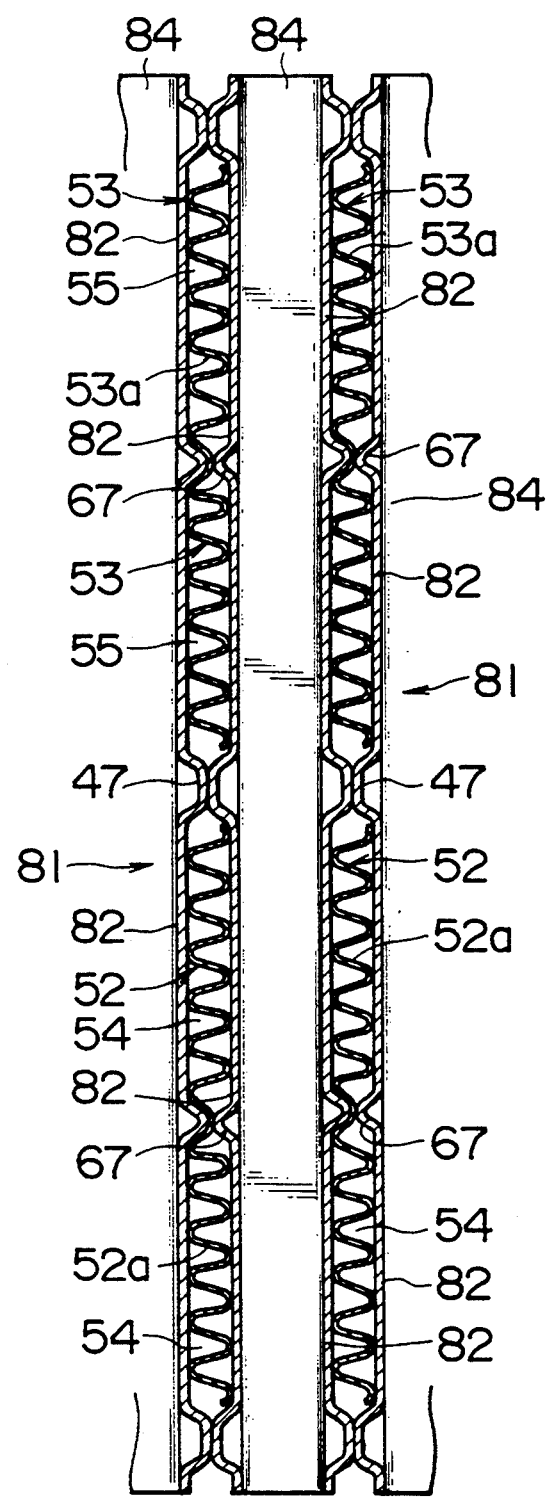
FIG. 7 is a cross-sectional view taken along the line VII—VII of FIG. 1.

The flat tube 81 will be described with reference to FIGS. 6 and 7. FIG. 6 is an exploded perspective view of a flat tube, and FIG. 7 is a cross-sectional view taken along the line VII—VII of FIG. 1.

The hollow portion of the plate 82 is divided into two chambers 48 and 49 by a partition 47 extending vertically at the center. The lower end portion of the partition 47 is omitted, so that the lower end of the plate 82 constitutes a U-turn portion 50 for allowing the U-turn of refrigerant.

By butting two plates 82 together, the inlet/outlet tank portion 83 is divided into the inlet portion 44 and the outlet portion 45 by the partition 47, and at the same time the flat tube is divided into the chamber 48 communicating with the inlet portion 44 and the chamber 49 communicating with the outlet portion 45. Further, the chamber 48 communicates with the chamber 49 at the U-turn portion 50. Thus, the chambers 48 and 49 and the U-turn portion 50 form a fluid passage 51.

Corrugated inner fins 52 and 53 are inserted in the straight portion of the chambers 48 and 49 of the fluid passage 51. The corrugated inner fin 52, 53 has a plurality of corrugations 52a, 53a formed along the lengthwise direction so that a plurality of flow paths 54, 55 are separately formed along the lengthwise direction (vertical direction) of the chamber 48, 49.

In the chambers 48 and 49, protruding walls 67 are formed, which extend in parallel to the partition 47 and form grooves on the outside of the plate 82. When two plates 82 are butted together, the corrugated inner fin 52, 53 is mounted so that the central portion is put between the protruding walls 67 as shown in FIG. 7.

By forming grooves on the outside of the plate 82 by means of the protruding wall 67, the outside surface of the flat tube 81 is provided with a groove formed by the partition 47 and grooves formed by the protruding walls 67, by which the flow-down of condensed water is accelerated, thereby splash of dew being prevented.

As shown in FIG. 6, at the U-turn portion 50 of the fluid passage 51, a plurality of U-shaped flow paths 56 are separately formed to guide the U-turn of refrigerant. The U-shaped flow paths 56 are formed by a plurality of U-shaped beads 57 press-formed on the butt face of the plate 82. The U-shaped flow path 56 is of a U shape along the form of the plate 82.

In the above-described flat tube 81, the refrigerant entering the inlet portion 44 passes through the flow path 54 separated by the corrugated inner fin 52 and is driven to the U-turn portion 50, where it makes a U-turn by means of the U-shaped flow path 56 separated by the U-shaped bead 57. Then, the refrigerant flows to the outlet portion 45 after passing through the flow path 55 separated by the corrugated inner fin 53.

Figure 21:
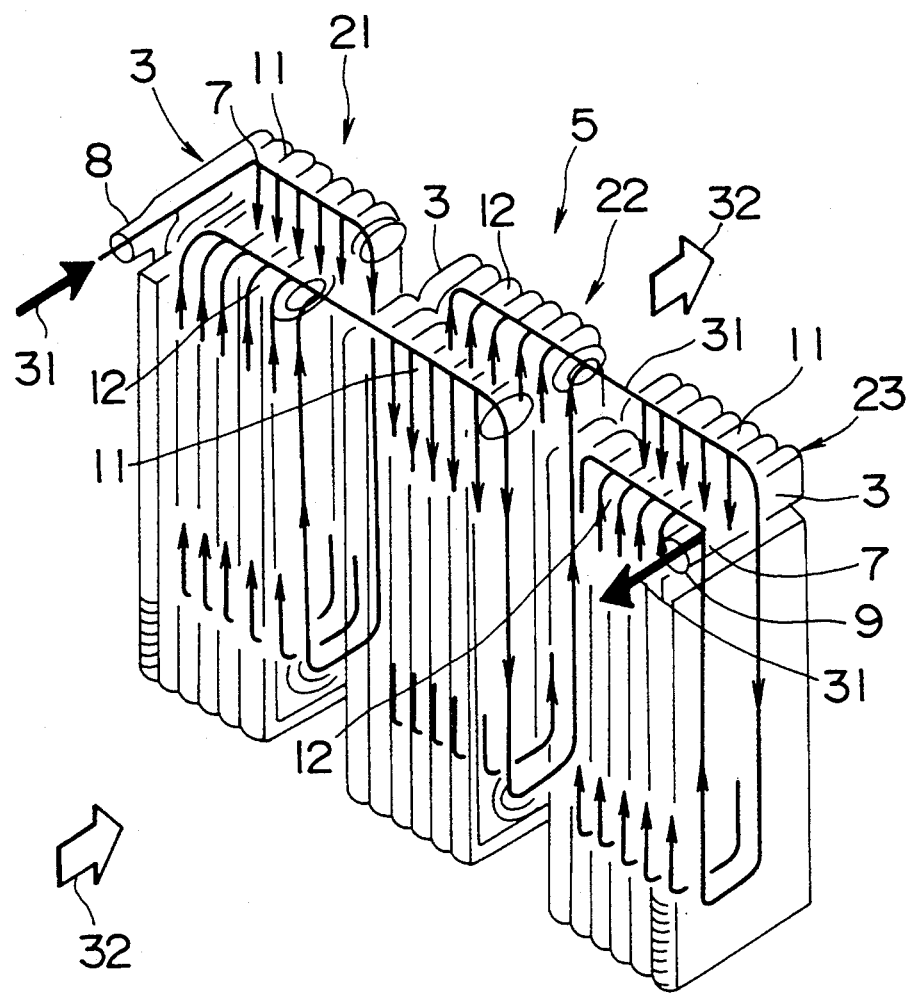
FIG. 21 is a schematic perspective view illustrating the flow of refrigerant in a stacked heat exchanger.

An example of the flow of refrigerant and air in the whole of an evaporator 85 in which the flat tubes 81 and the corrugated fins 84 are alternately put together is the same as shown in FIG. 21.

As shown in FIGS. 1 through 4, on the internal surface of the side plate 90, three grooves 91 are formed in this embodiment, which extend vertically and are convex on the outside. The condensed water inside the side plate 90 flows down by the guidance of three grooves 91. The number of grooves is not limited to three.

As shown in FIG. 3, the side plate 90 is provided with a plurality of through holes 92. The diameter of the through hole 92 are gradually increased downward. The condensed water on the internal surface of the side plate 90 is discharged through the through holes 92. This hole 92 may be an elongated hole.

By installing the grooves 91 and the through holes 92 on the side plate 90, the condensed water inside the side plate 90 flows down by the guidance of the grooves and is discharged to the outside through the through holes 92. Thus, the condensed water does not flow to the after-flow side of air.

Figure 5:
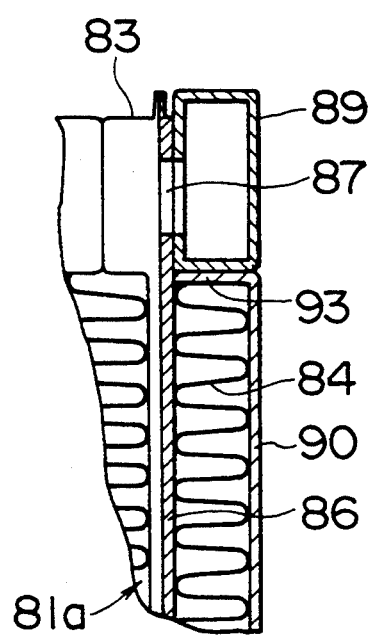
FIG. 5 is an expanded cross-sectional view of the arrow V portion in FIG. 1.

The state of the upper portion of the side plate 90 will be described with reference to FIGS. 1 through 5. FIG. 5 is an expanded cross-sectional view of the arrow V portion in FIG. 1.

The outlet header 89 has a substantially rectangular cross section, and is connected to the communicating hole 87 of the end plate 86. A horizontal portion 93 is formed at the upper end of side plate 90. The edge of the horizontal portion 93 is joined to the end plate 86.

The lower surface of the outlet header 89 and the upper surface of the horizontal portion 93 are in abutting relationship, and are joined to each other by brazing as necessary.

Since the outlet header 89 is joined to the side plate 90, a force in the spreading direction applied to the inlet/outlet tank portion 83 when a pressure is applied is received by the side plate 90, so that the deformation of the whole evaporator 85 is inhibited. The side plate 90 has a sufficient strength because it has the grooves 91, which are convex to the outside, so that deformation can be surely prevented.

In the core portion of the evaporator 85, plates 82 are joined via the corrugated inner fins 52 and 53, so that there are many brazed portions. Therefore, there is a large difference in strength between the inlet/outlet tank portion 83 and the core portion. As a result, a large difference in deformation occurs between the core portion and the inlet/outlet tank portion 83 when a pressure is applied. As described above, however, the deformation at the inlet/outlet tank portion, where the strength is low, can be prevented by joining the outlet header 89 to the side plate 90.

Although FIG. 5 shows the joint portion of the outlet header 89 and the side plate 90, the inlet header 88 has the same shape as the outlet header 89, and the portion jointed to the side plate 90 has the same configuration.

In the above-described evaporator 85, since the lower surface of the inlet header 88 and the outlet header 89 is joined to the upper surface of the side plate 90, a force in the spreading direction applied to the inlet/outlet tank portion 83 when a pressure is applied is received by the side plate 90, so that the deformation of the whole evaporator 85, which has a large difference in strength between the core portion and the inlet/outlet tank portion 83, can be inhibited.

Since there is no gap between the inlet header 88 and the side plate 90 and between the outlet header 89 and the side plate 90, no leakage of air occurs, so that there is no possibility of decreased heat exchange property.

In the above-described stacked heat exchanger, since the upper end of the side plate is abutted against the lower end of the inlet header and the lower end of the outlet header, a force in the spreading direction applied to the tank portion when a pressure is applied is received by the abutting of the side plate against the inlet and outlet headers. As a result, the rigidity against pressure of the stacked heat exchanger is improved, thereby the deformation of the whole stacked heat exchanger being minimized.

Figure 8:
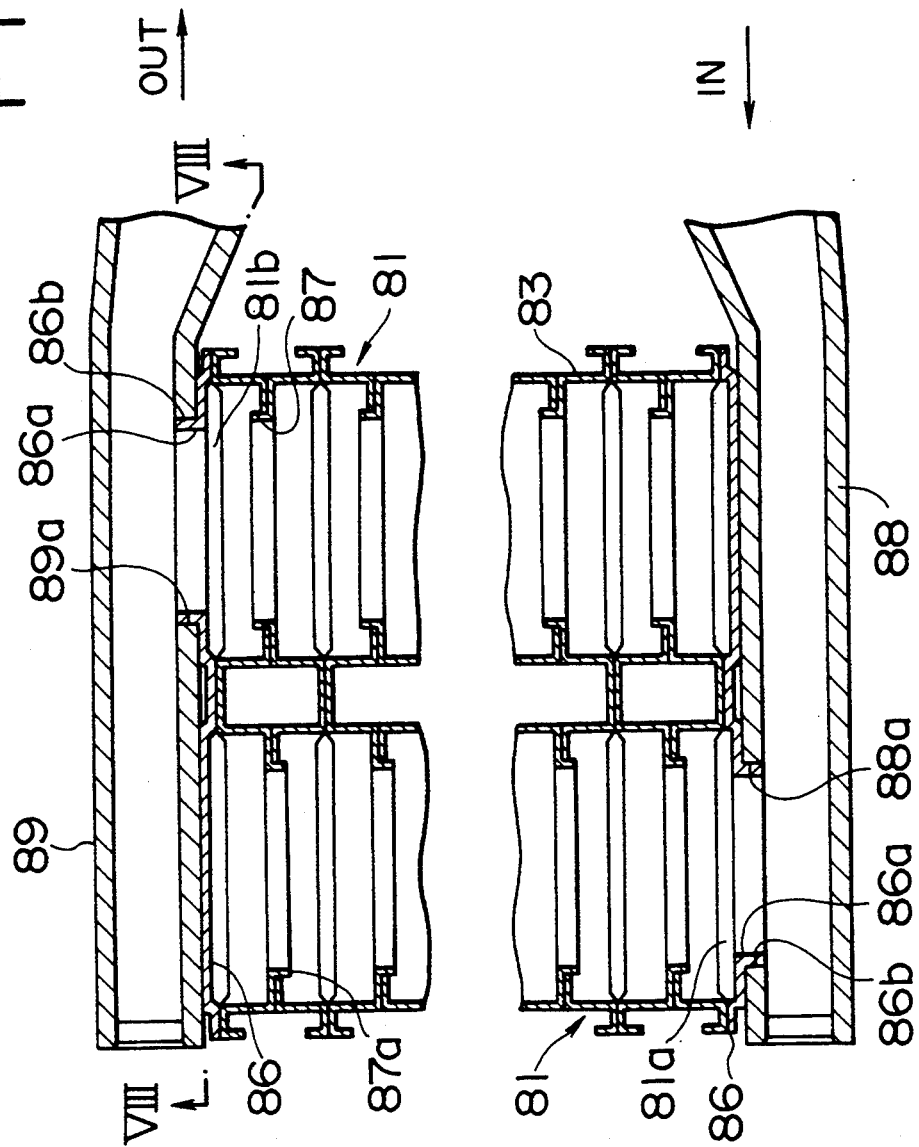
FIG. 8 is a cross-sectional view taken along a plan of the stacked heat exchanger.

In the above-described flat tube 81, the inlet portion 44 and the outlet portion 45 of the tank portion 83 is of an elongated flat shape in the plate width direction. One of the communicating holes 87, which communicates with the inlet portion 44 or the outlet portion 45, is a through hole, while the other of the communicating holes 87 has a flange portion at its edge. As shown in FIG. 8, this flange portion 87a is inserted into the communicating hole 87 of the adjacent flat tube 81.

As shown in FIG. 8, the flat tubes 81a and 81b located at each end is constructed by combining the plate 82 and the end plate 86 which has a communicating hole 86a having the flange portion 86b. A supply port 88a of the inlet header 88 is fitted to the flange portion 86b of the communicating hole 86a of the flat tube 81a installed on the inlet side of refrigerant. A discharge port 89a of the outlet header 89 is fitted to the flange portion 86b of the communicating hole 86a of the flat tube 81b installed on the outlet side of refrigerant. An inlet pipe for refrigerant is connected to the inlet header 88, while an outlet pipe for refrigerant is connected to the outlet header 89.

The corrugated fins 84 are disposed at the outside of the end plate 86, and the side plate 90, which is an external frame of the stacked heat exchanger, is disposed at the outside of the corrugated fins 84.

The plate 82, corrugated fin 84, etc. are formed of a clad material in which a base of aluminum-base metal is clad with a sheet-shaped brazing material. Therefore, the flat tube 82, corrugated fin 84, headers 88 and 89 are stacked and combined, and restrained in this state by means of jigs or the like, and then heated for a predetermined time in a heating furnace for assembly by brazing.

Figure 9:
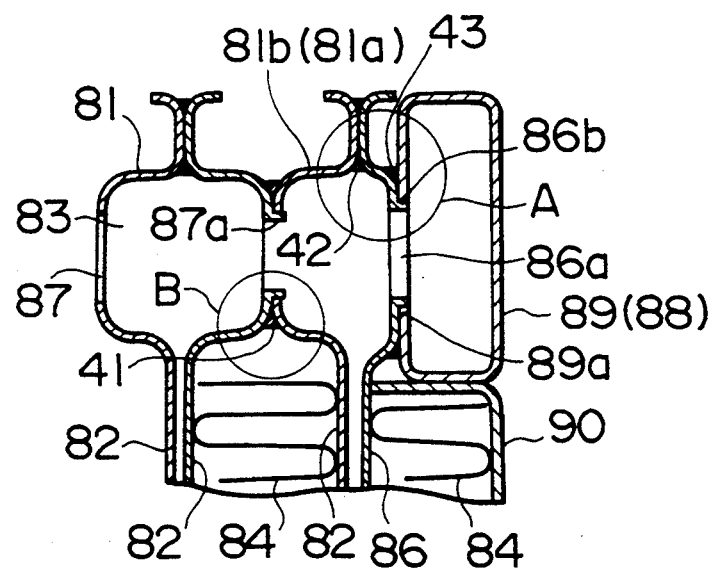
FIG. 9 is a longitudinal cross-sectional view of the arrow V portion in FIG. 1.
Figure 10:
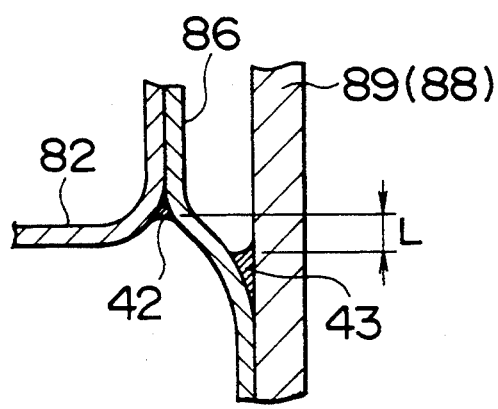
FIG. 10 is a partially expanded cross-sectional view of A portion in FIG. 9.
Figure 11:
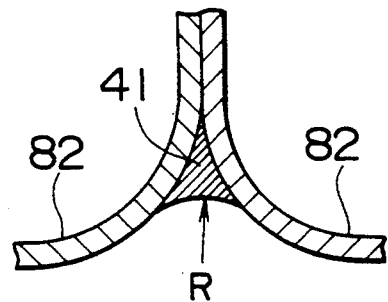
FIG. 11 is a partially expanded cross-sectional view of B portion in FIG. 9.

By brazing, a fillet 41 is produced between the tank portions 83 as shown in FIGS. 9 and 10. The surface of this fillet should have a curvature radius R not less than 0.2 mm. If the radius R is 0.2 mm or more, the stacked heat exchanger satisfies the criterion of predetermined resistance to repeated pressure (for example, pressure: 17 kgf/cm$^2$, 150,000 cycles)

As shown in FIG. 10, in the flat tubes 81a and 81b which are located at the end, the vertical distance L between the fillet 42, which is disposed at the upper brazing joint between the plate 82 and the end plate 86, and the fillet 43, which is disposed at the upper brazing joint between the header 88, 89 and the end plate 86, should be 0.2 mm or less. That is to say, the shape of the end plate 86 is determined so that dimension L is small, and the brazing material supplied to this area is adjusted so that the fillets 42 and 43 are increased.

An experiment indicated that the stress created at the brazing joint is reduced by setting dimension L to 2 mm or less.

To provide a radius R of the fillet not less than 0.2 mm and dimension L not more than 0.2 mm, the clad material and brazing conditions (heating temperature, heating time, etc.) are properly selected.

In the above-described stacked heat exchanger, the size of the fillet 41 at the tank portion 83, and the distance from the joint fillet 42 between the plate 82 and the end plate 86 to the joint fillet 43 between the end plate 86 and the header 88, 89 are specified. Therefore, the strength in the direction of tank portion 83 is enhanced, and the risk of harmful deformation and breakage at the brazed portion and its vicinity is eliminated.

Figure 12:
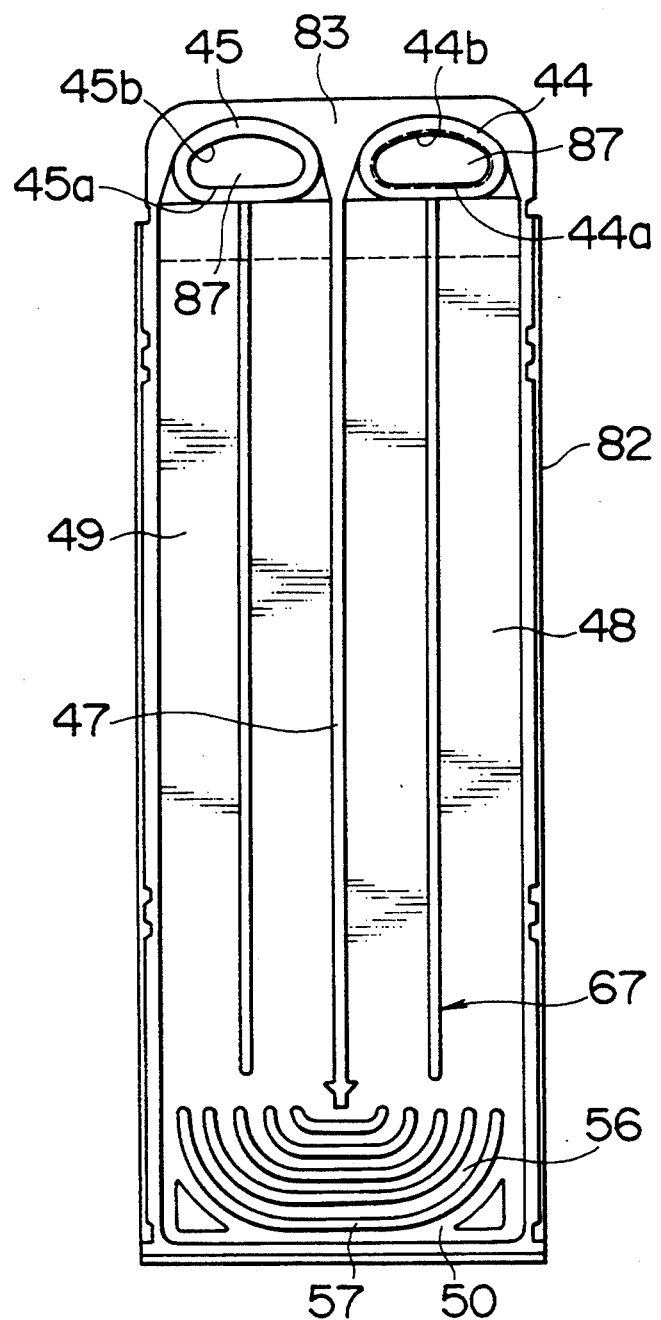
FIG. 12 is a front view of a plate forming a flat tube.
Figure 13:
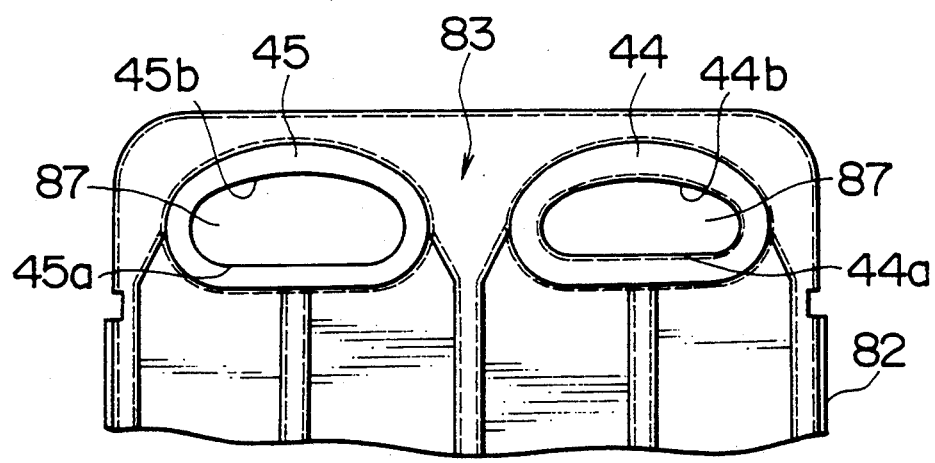
FIG. 13 is an expanded view of the upper portion of the plate.

In the above-described flat tube 81, the inlet portion 44 and the outlet portion 45 of the inlet/outlet tank portion 83 are, as shown in FIGS. 12 and 13 in detail, of an elongated flat shape in the plate width direction. The lower half 44a, 45a is of an elongated circular shape, and the upper half 44b, 45b is of an elliptical shape.

In the stacked heat exchanger using the flat tubes 81a and 81b of the above construction, since the inlet/outlet tank portion 83 is flat, the dimension in the height direction can be reduced. Further, since the upper half is elliptical, the strength is high, by which desired repeated strength and compressive strength are provided.

Only the upper half should be elliptical. This is because the elliptical shape of the upper half is sufficient in terms of strength and because the effective area must be ensured.

Therefore, in the above-described stacked heat exchanger, since only the upper half 44b, 45b of the inlet/outlet tank portion 83 is made elliptical, the strength can be enhanced without an appreciable decrease in flow path of refrigerant, thereby the repeated pressurizing speed and impressive strength being improved.

Further, the compressive strength of the whole stacked heat exchanger is improved by enhancing the strength not only in the stacking direction but also the circumferential direction.

Figure 14:
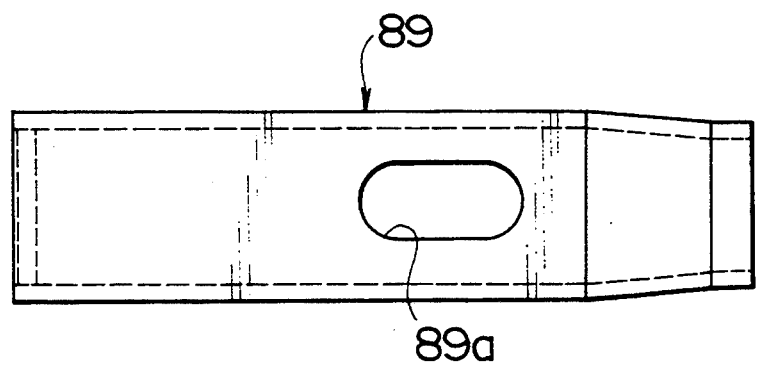
FIG. 14 is a view taken along the line VIII—VIII of FIG. 8.
Figure 15:
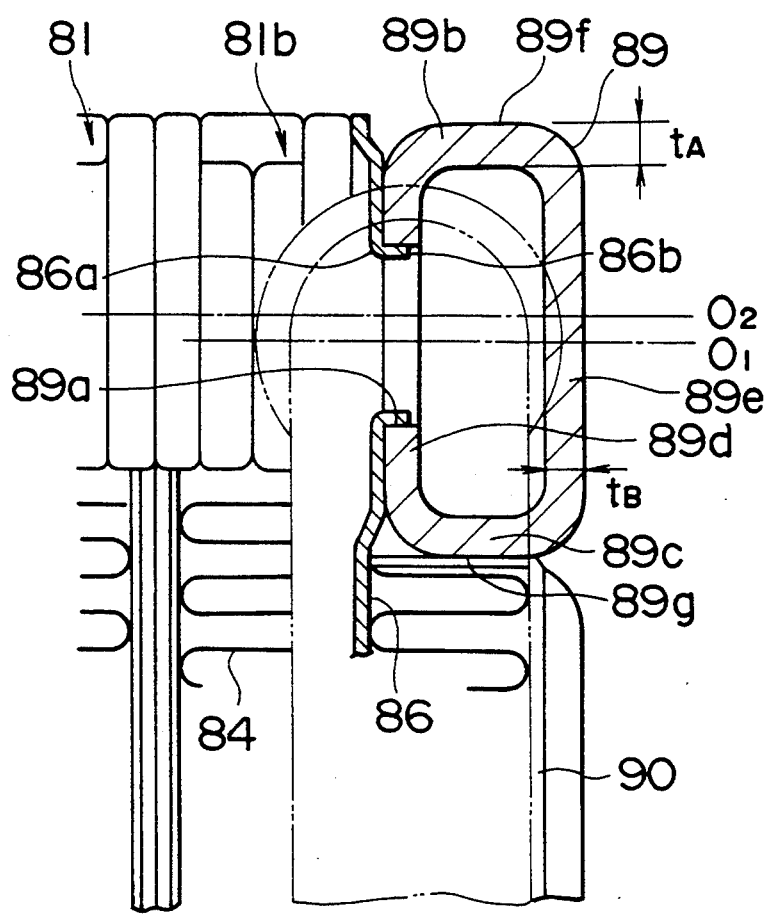
FIG. 15 is a cross-sectional view of a header portion.
Figure 16:
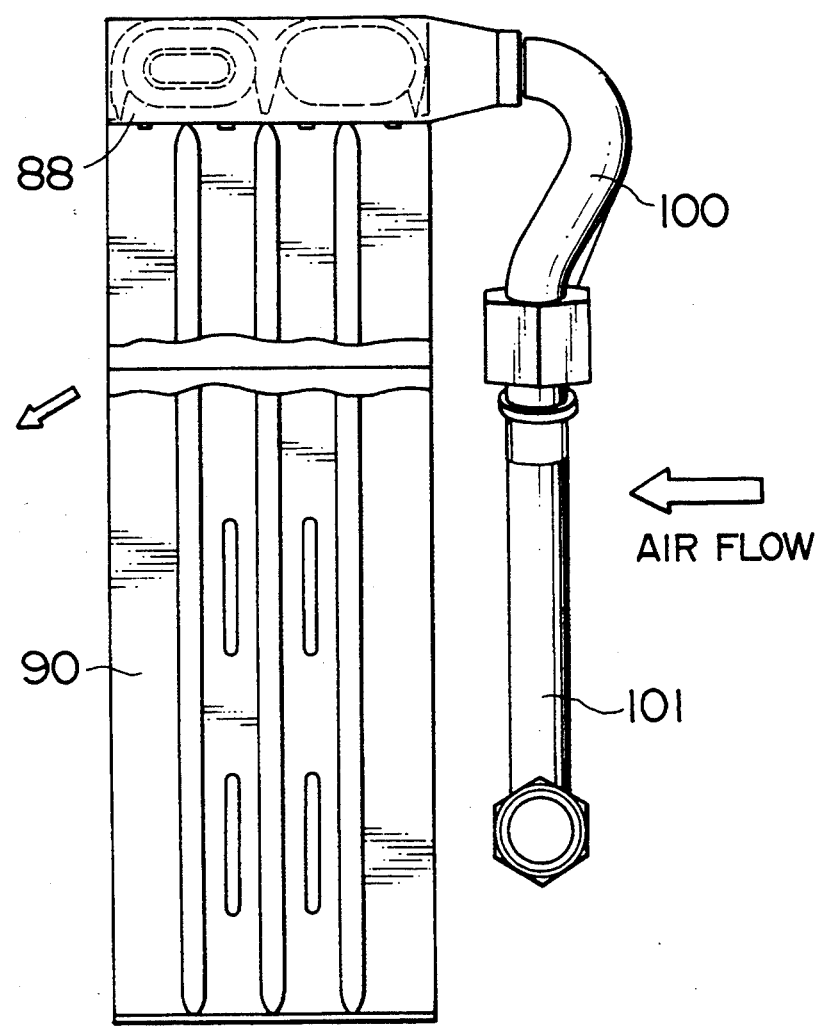
FIG. 16 is a view corresponding to FIG. 3.
Figure 17:
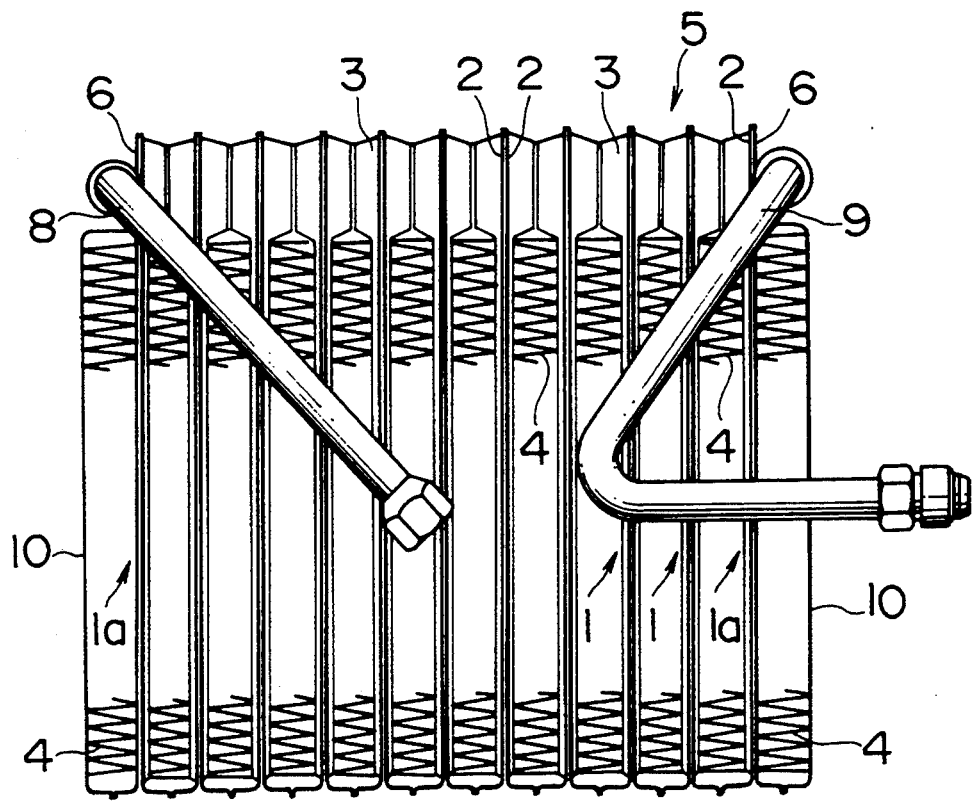
FIG. 17 is a side view of a conventional stacked heat exchanger.
Figure 18:
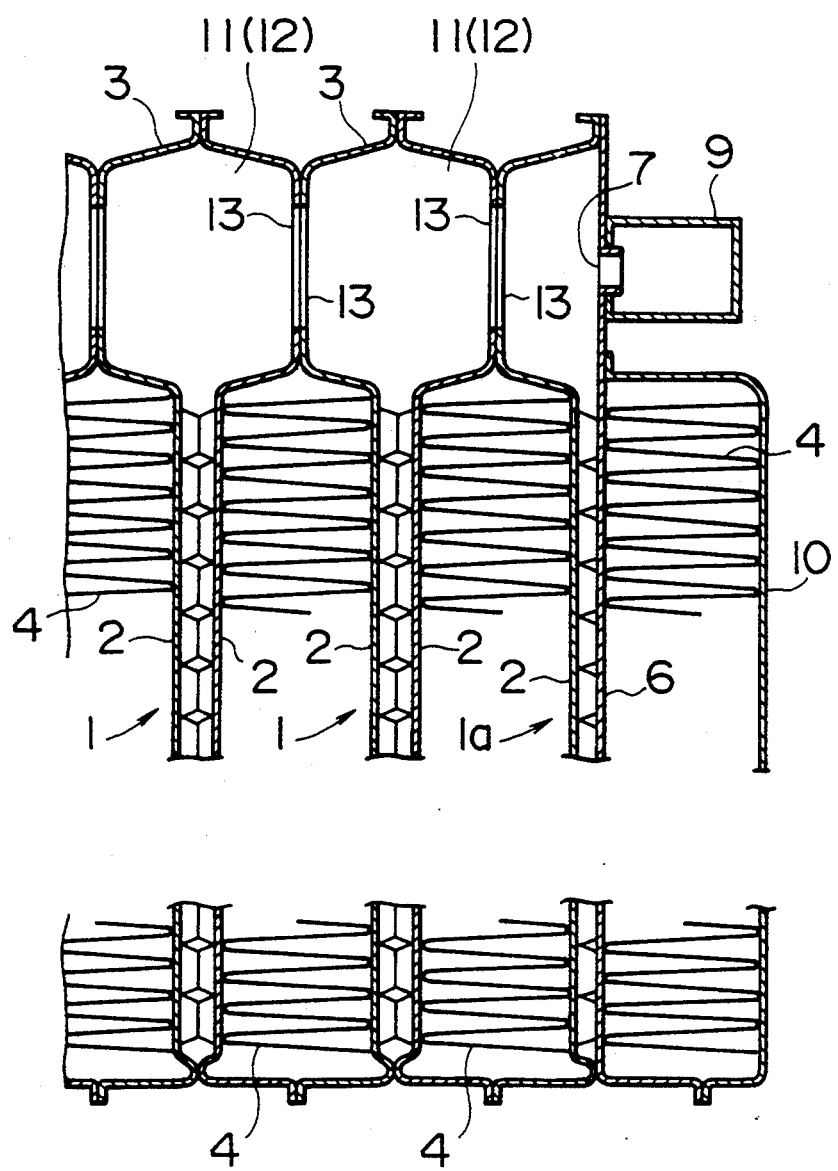
FIG. 18 is an expanded cross-sectional view of the right side portion in FIG. 16.

Next, the construction of the outlet header 89 and the inlet header 88 will be described with reference to FIGS. 14 through 16.

The cross section of the outlet header 89 is of a vertically long shape in which the vertical dimension is larger than the dimension in the width direction. The inside of the upper portion 89b and the lower portion 89c is of an elliptical arc shape in the width direction. The thickness $T_A$ of the upper portion 89b and the lower portion 89c is larger than the thickness $T_B$ of the vertical side portions 89d and 89e. The upper surface 89f of the header 89 is at the same level as the flat tube 81, 81a, 81b or lower. Therefore, the vertical center $O_1$ of the header 89 does not coincide with the center $O_2$ in the height direction of the outlet portion or the flange portion 86b of the communicating hole 86b. The discharge port 89a disposed at the inside vertical side portion 89d of the header 89 is positioned by shifting vertically with respect to the center $O_1$.

The lower surface 89g of the header 89 provides a flat portion to perform a function of regulating the upper end position of the side plate 90.

The inlet header 88 has the same construction as the outlet header 89 except the position of the supply port 88a. The supply port 88a of the inlet header 88 is disposed so as to coincide with the position of the communicating hole 86a disposed in the other end plate 86. The inlet pipe 100 and the outlet pipe 101 for refrigerant are connected to the headers 88 and 89, respectively.

In the condition in which the evaporator is assembled, the outside surface of the header 88, 89 is substantially flush with the external surface of the side plate, and the upper surface thereof is substantially flush with the top surface of the flat tube 81 and the like, so that there is no protrusion as a whole. In other words, there is no loss space.

When brazing is performed in a stacked state, the restraining fixtures are applied to the headers 88 and 89 at both ends.

Although the upper and lower portions of the header 88, 89 is of an elliptical arc shape in the above embodiment, they may be of normal circular arc shape. The stacked heat exchanger to which the header in accordance with the present invention is applied is not limited to the stacked heat exchanger of this type. The header can be applied to any heat exchanger. The construction of the core portion and the like is not limited to the above embodiment.

The header in accordance with the present invention provides a shape without protrusions as the whole stacked heat exchanger while maintaining the flow path area. Further, since the upper and lower portions are of circular arc shape, the strength is high, and deformation does not occur when the refrigerant flows.

We claim:

1. A stacked heat exchanger comprising flat tubes and corrugated fins which are alternately put together, wherein said flat tube has a tank portion and a core portion, said tank portion on one side at an outermost portion has an inlet header, said tank portion on the other side at the outermost portion has an outlet header, and said core portion has a side plate as an external plate at both ends, wherein an upper end of said side plate abuts against a lower end of said inlet header and a lower end of said outlet header.

2. A stacked heat exchanger according to claim 1, wherein a horizontal portion against which the lower ends of said inlet header and said outlet header abut is formed at the upper end portion of said side plate.

3. A stacked heat exchanger comprising flat tubes and corrugated fins which are alternately put together, each said flat tube including two abutting plates having a tank portion and a core portion, said plates located on right and left sides constitute an end plate, said end plate has headers at an inlet and outlet of fluid, and parts are joined by brazing joints, wherein a brazing fillet radius R at the tank portion of said flat tube is not less than 0.2 mm, and a vertical distance from a brazing fillet between said plate and an upper brazing joint of said end plate to a brazing fillet between said header and said upper brazing joint of said end plate is not more than 0.2 mm.

4. A stacked heat exchanger comprising flat tubes and corrugated fins which are alternately put together, wherein said flat tube is formed by butting two press-formed plates which have inlet/outlet tank portions at one end and a fluid passage between said inlet/outlet tank portions, wherein an upper half of said inlet/outlet tank portion is elliptical.

* * * * *